(12) United States Patent
Fenn et al.

(10) Patent No.: US 10,458,442 B2
(45) Date of Patent: Oct. 29, 2019

(54) BLOW DOWN ACTUATOR ASSEMBLY

(71) Applicant: AERO CONTROLEX GROUP INC., Painesville, OH (US)

(72) Inventors: Christopher L. Fenn, Hudson, OH (US); Patrick Cronin, Willoughby Hills, OH (US)

(73) Assignee: AERO CONTROLEX GROUP INC., Painesville, OH (US)

( * ) Notice: Subject to any disclaimer, the term of this patent is extended or adjusted under 35 U.S.C. 154(b) by 98 days.

(21) Appl. No.: 15/785,962

(22) Filed: Oct. 17, 2017

(65) Prior Publication Data

US 2018/0038392 A1 Feb. 8, 2018

Related U.S. Application Data

(63) Continuation of application No. 14/591,602, filed on Jan. 7, 2015, now Pat. No. 9,790,969, which is a (Continued)

(51) Int. Cl.
*F15B 15/14* (2006.01)
*F15B 15/08* (2006.01)
(Continued)

(52) U.S. Cl.
CPC .............. *F15B 15/14* (2013.01); *B64C 25/30* (2013.01); *F15B 15/088* (2013.01); *F15B 15/19* (2013.01);
(Continued)

(58) Field of Classification Search
CPC ........ F15B 15/14; F15B 15/088; F15B 15/19; F15B 2211/8752; F15B 2211/8757; B64C 25/30; F16H 25/10
(Continued)

(56) References Cited

U.S. PATENT DOCUMENTS 2,476,376 A 7/1949 Laraque
3,563,106 A 2/1971 Goodman
(Continued)

FOREIGN PATENT DOCUMENTS

DE 102009049263 A1 7/2010
GB 587460 A 4/1947
(Continued)

OTHER PUBLICATIONS

Office Action issued in Canadian Application No. 2,875,657, dated Feb. 11, 2019.
(Continued)

*Primary Examiner* — Michael Leslie
*Assistant Examiner* — Daniel S Collins
(74) *Attorney, Agent, or Firm* — BakerHostetler

(57) ABSTRACT

An actuator assembly includes an actuation member, a release member, and a source of pressurized gas, wherein during a normal mode of operation, the actuation member and the release member are engaged to move in unison, and wherein during an emergency mode of operation, pressurized gas automatically decouples the actuation member from the release member to move separately. In accordance with yet other aspects of the present disclosure, an electro-mechanical actuator includes an electro-mechanical drive system and an integrated backup system operated by a gas generator, wherein when the backup system is activated, the electro-mechanical drive system is decoupled and the actuator moves to a predetermined position and mechanically locks in place.

20 Claims, 19 Drawing Sheets

Related U.S. Application Data continuation of application No. PCT/US2013/044068, filed on Jun. 4, 2013.

(60) Provisional application No. 61/655,331, filed on Jun. 4, 2012.

(51) Int. Cl.
*B64C 25/30* (2006.01)
*F16H 25/20* (2006.01)
*F15B 15/19* (2006.01)

(52) U.S. Cl.
CPC ...... *F16H 25/20* (2013.01); *F15B 2211/8752* (2013.01); *F15B 2211/8757* (2013.01); *F16H 25/2015* (2013.01); *F16H 2025/2071* (2013.01); *F16H 2025/2081* (2013.01)

(58) Field of Classification Search
USPC .................................................. 60/404, 405
See application file for complete search history.

(56) References Cited

U.S. PATENT DOCUMENTS

| | | | |
|---|---|---|---|
| 4,872,239 A | 10/1989 | Ferguson et al. | |
| 5,184,465 A | 2/1993 | Howard et al. | |
| 5,285,392 A | 2/1994 | Fan et al. | |
| 5,288,037 A | 2/1994 | Derrien | |
| 6,802,488 B1 | 10/2004 | Patterson | |
| 2009/0223479 A1 | 9/2009 | Schoell | |
| 2010/0024161 A1 | 2/2010 | Wood et al. | |
| 2010/0024580 A1 | 2/2010 | Hadley et al. | |
| 2010/0282901 A1* | 11/2010 | Mason | B64C 25/18 244/102 R |
| 2013/0105624 A1 | 5/2013 | Dubois | |
| 2016/0025199 A1 | 1/2016 | Boone et al. | |
| 2016/0195115 A1 | 7/2016 | Fenn et al. | |

FOREIGN PATENT DOCUMENTS

| | | |
|---|---|---|
| GB | 613233 A | 11/1948 |
| JP | 2002-213406 A | 7/2002 |
| WO | 2010/129960 A1 | 11/2010 |

OTHER PUBLICATIONS

International Search Report and Written Opinion issued in PCT/US2018/064458, dated Feb. 27, 2019.

European Patent Application No. 13800839.6; Supplementary Search Report; dated Jan. 26, 2017; 8 pages.

International Search Report and Written Opinion of the ISA in PCT/US13/44068; dated Oct. 24, 2013.

\* cited by examiner

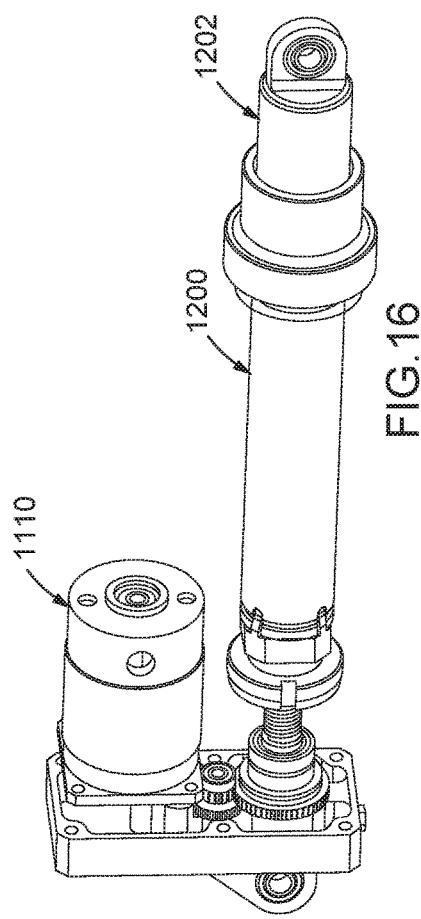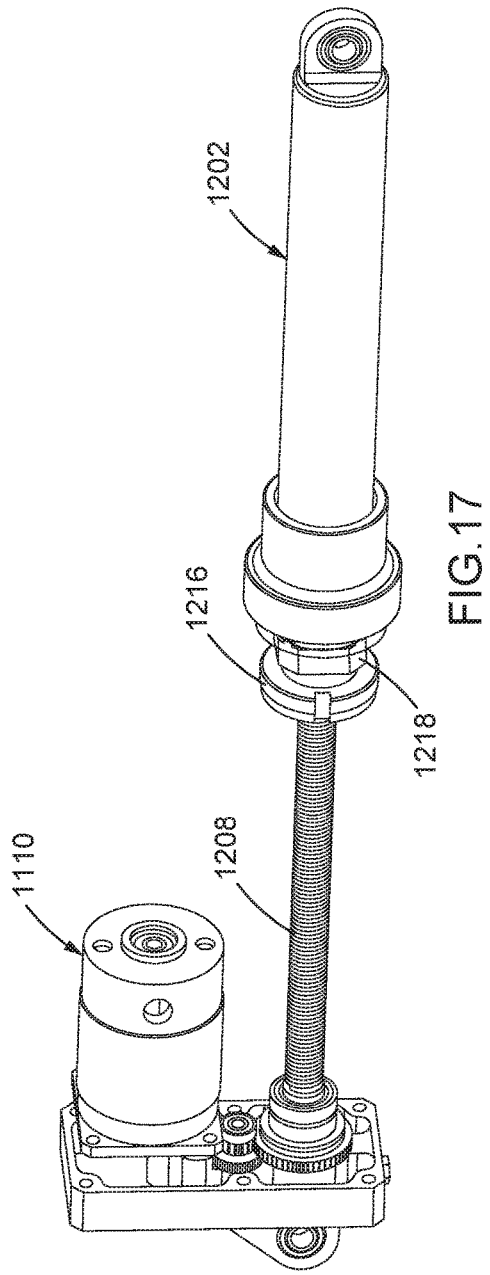

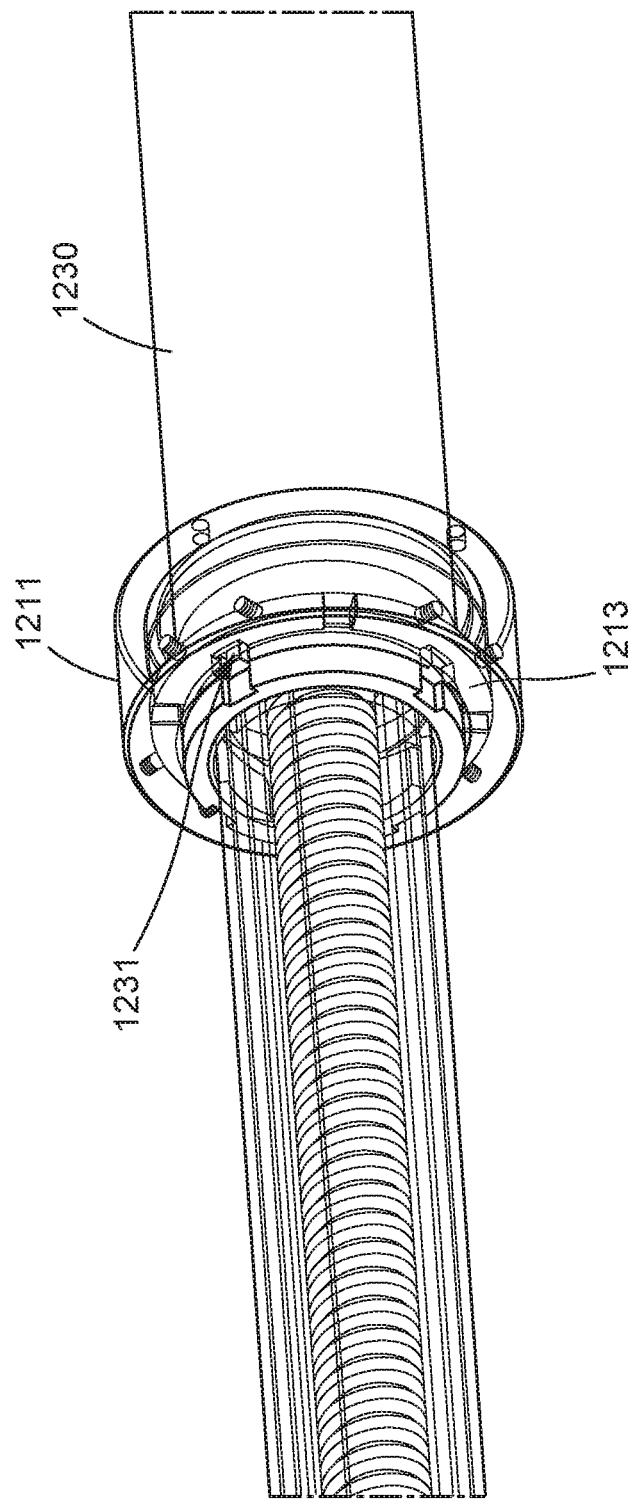

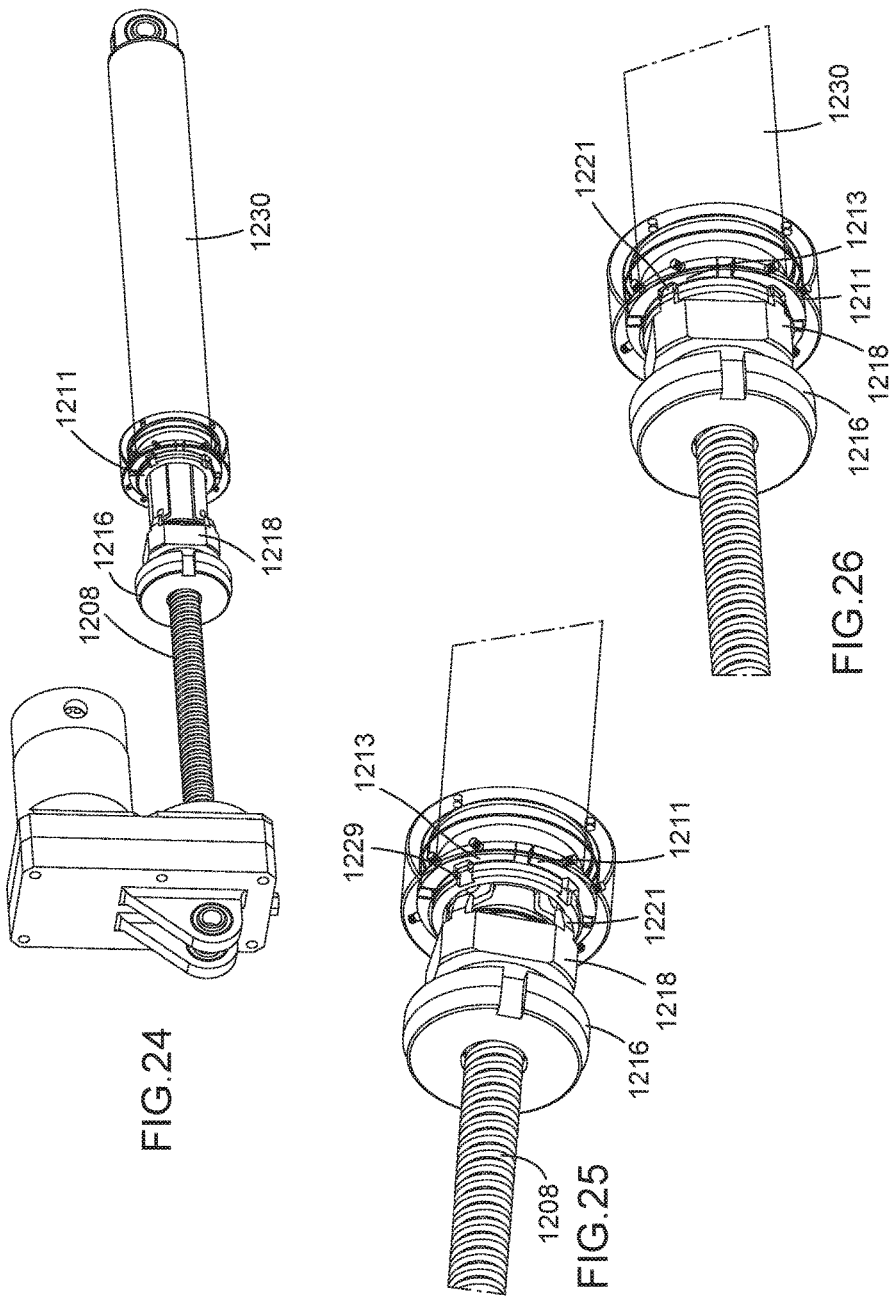

BLOW DOWN ACTUATOR ASSEMBLY

CROSS REFERENCE TO PRIOR APPLICATIONS

This application is a continuation of application Ser. No. 14/591,602, filed Jan. 7, 2015, now U.S. Pat. No. 9,790,969, issued Oct. 17, 2017, which is a continuation of International Application No. PCT/US2013/044068, filed Jun. 4, 2013 designating the U.S., which claims priority to provisional Patent Application No. 61/655,331, filed Jun. 4, 2012, all of which are incorporated herein by reference in their entirety.

FIELD OF THE DISCLOSURE

The present disclosure relates to actuator mechanisms, more particularly to an actuator assembly having an integrated emergency backup system.

BACKGROUND OF THE DISCLOSURE

Mechanical linear actuators are used for translating rotational motion to linear motion. For example, ball screws are linear actuators that rely on a threaded shaft and a nut housing. The nut housing typically contains ball bearings that engage a helical raceway defined by the threaded shaft. Thus, rotational movement of the shaft translates into linear movement of the nut housing along the shaft. These types of linear actuators are often used in aeronautical applications, for example, to control movement of control surfaces, open and close windows, doors, and/or access panels, and control the extension of landing gear. Linear actuators are also often used to convert rotary motion from an electric motor to axial movement of a steering rack in vehicular power steering systems and for precision control in robotic manufacturing.

Particularly in aeronautical applications, the failure of a mechanical linear drive system can have catastrophic consequences. The failure of one or more aspects of the drive system, such as the motor, the gear train, or the ball screw drive, may result, for example, in the landing gear of an airplane failing to extend or to extend into a fully locked open position. Accordingly, emergency systems are often provided that override and/or bypass the mechanical linear drive system to address such failures. However, these systems are often separate assemblies from the drive assembly, requiring additional space and hardware to accommodate the assembly. There is a need and desire for an actuator assembly that has an integrated emergency system, a system that automatically decouples aspects of the system from the normal drive configuration during an emergency.

SUMMARY OF THE DISCLOSURE

Embodiments of the present disclosure advantageously provide an actuation assembly and methods of use thereof. A preferred embodiment of an actuator assembly includes an actuation member, a release member, and a source of pressurized gas, wherein during a normal mode of operation, the actuation member and the release member are engaged to move in unison, and wherein during an emergency mode of operation, pressurized gas automatically decouples the actuation member from the release member to move separately.

In accordance with yet other aspects of the present disclosure, an electro-mechanical actuator includes an electro-mechanical drive system and an integrated backup system operated by a gas generator, wherein when the backup system is activated, the electro-mechanical drive system is decoupled and the actuator moves to a predetermined position and mechanically locks in place.

There has thus been outlined, rather broadly, certain embodiments of the disclosure in order that the detailed description thereof may be better understood, and in order that the present contribution to the art may be better appreciated. There are, of course, additional embodiments of the disclosure that will be described below and which will form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present disclosure. It is important, therefore, that the claims be regarded as including such equivalent constructions insofar as they do not depart from the spirit and scope of the present disclosure.

BRIEF DESCRIPTION OF THE DRAWINGS

The accompanying drawings, which are incorporated in and constitute a part of this specification, illustrate various embodiments consistent with the disclosure, and, together with the description, serve to explain the principles of the disclosure.

FIG. 16 is a front perspective view of the blow down actuator assembly shown in FIG. 14 with a cover tube and gear housing removed to illustrate internal components of the assembly, in accordance with certain aspects of the present disclosure;

FIG. 17 is a front perspective view of the blow down actuator assembly shown in FIG. 14 with a cover tube and gear housing removed and with the drive arm assembly in an extended position of use, in accordance with certain aspects of the present disclosure;

FIG. 23 is a close-up cutaway perspective view with a cover tube removed to illustrate internal components of the blow down actuator assembly shown in FIG. 14 in an emergency mode of operation, in accordance with certain aspects of the present disclosure; and FIGS. 24 to 26 illustrate in series the blow down actuator assembly shown in FIG. 14 with a cover tube removed to illustrate a reengagement procedure following an emergency procedure, in accordance with certain aspects of the present disclosure.

DETAILED DESCRIPTION

Figure 1:
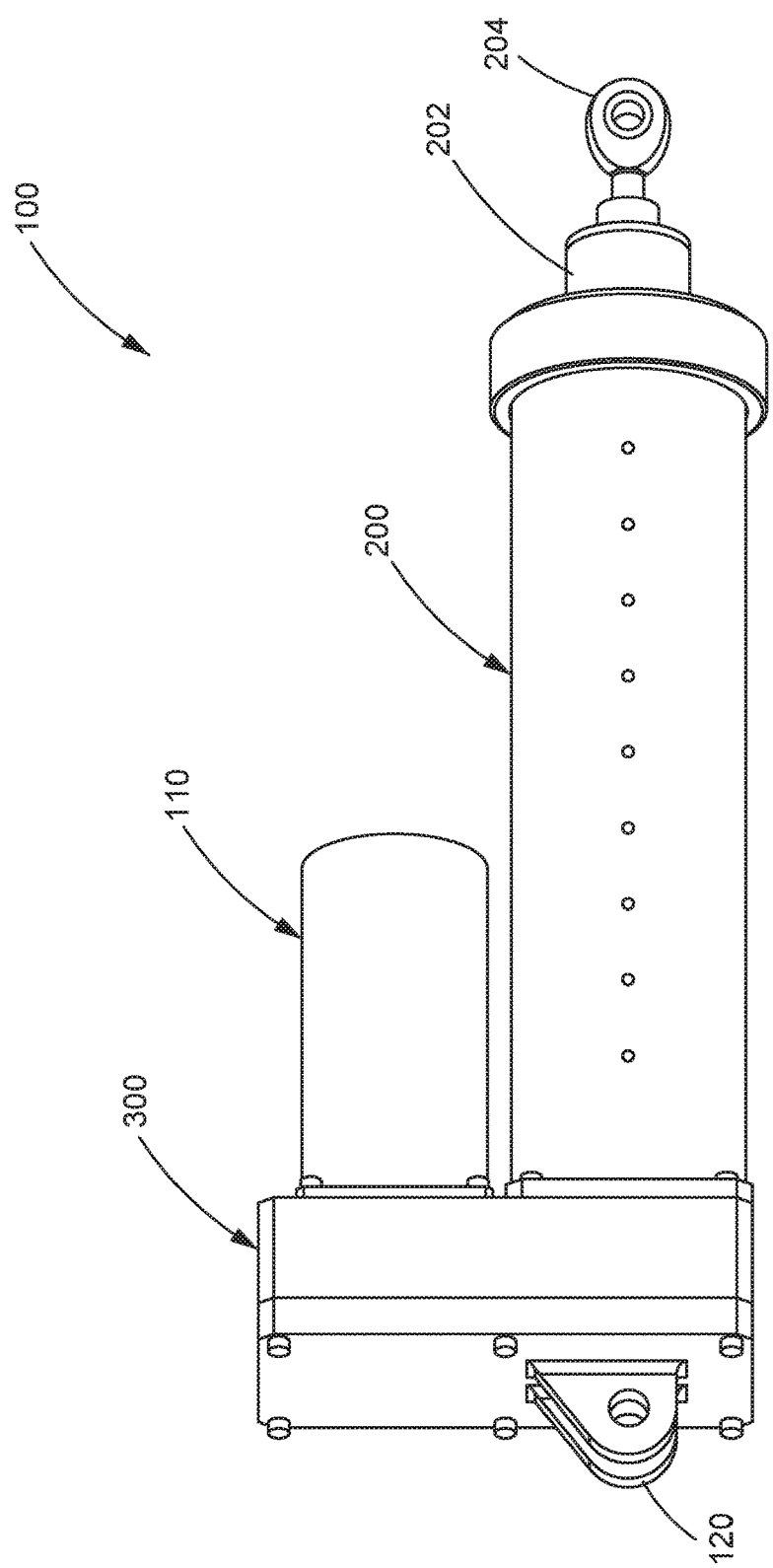
FIG. 1 is a front perspective view of a blow down actuator assembly, in accordance with certain aspects of the present disclosure.

The disclosure will now be described with reference to the drawing figures, in which like reference numerals refer to like parts throughout.

Various aspects of an actuator assembly may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled," "directly attached," and/or "directly joined" to another component, there are no intervening elements present.

Relative terms such as "lower" or "bottom" and "upper" or "top" may be used herein to describe one element's relationship to another element illustrated in the drawings. It will be understood that relative terms are intended to encompass different orientations of an electric strike assembly in addition to the orientation depicted in the drawings. By way of example, if aspects of an actuator assembly shown in the drawings are turned over, elements described as being on the "bottom" side of the other elements would then be oriented on the "top" side of the other elements. The term "bottom" can therefore encompass both an orientation of "bottom" and "top" depending on the particular orientation of the apparatus.

FIGS. 1-4 illustrate multiple views of an assembled blow down actuator assembly 100 in accordance with aspects of the present disclosure. The actuator assembly 100 may include an electric motor 110 operably connected to a drive assembly 200 via a gear train housed in a gear housing 300. A mounting device 120, such as a bracket or any other suitable mounting mechanism, may be provided on a surface of the gear housing 300 for mounting the actuator assembly 100 to a stable support structure, such as the body structure of an airplane. The drive assembly 200 includes a drive arm assembly 202 for actuation of a controlled member, such as a control surface, door, or a landing gear, for example. A distal end of the drive arm assembly 202 may be provided with a connection device 204, such as an eye bolt rod or any other suitable connection device, for connecting the drive arm assembly 202 to the controlled member.

Figure 2:
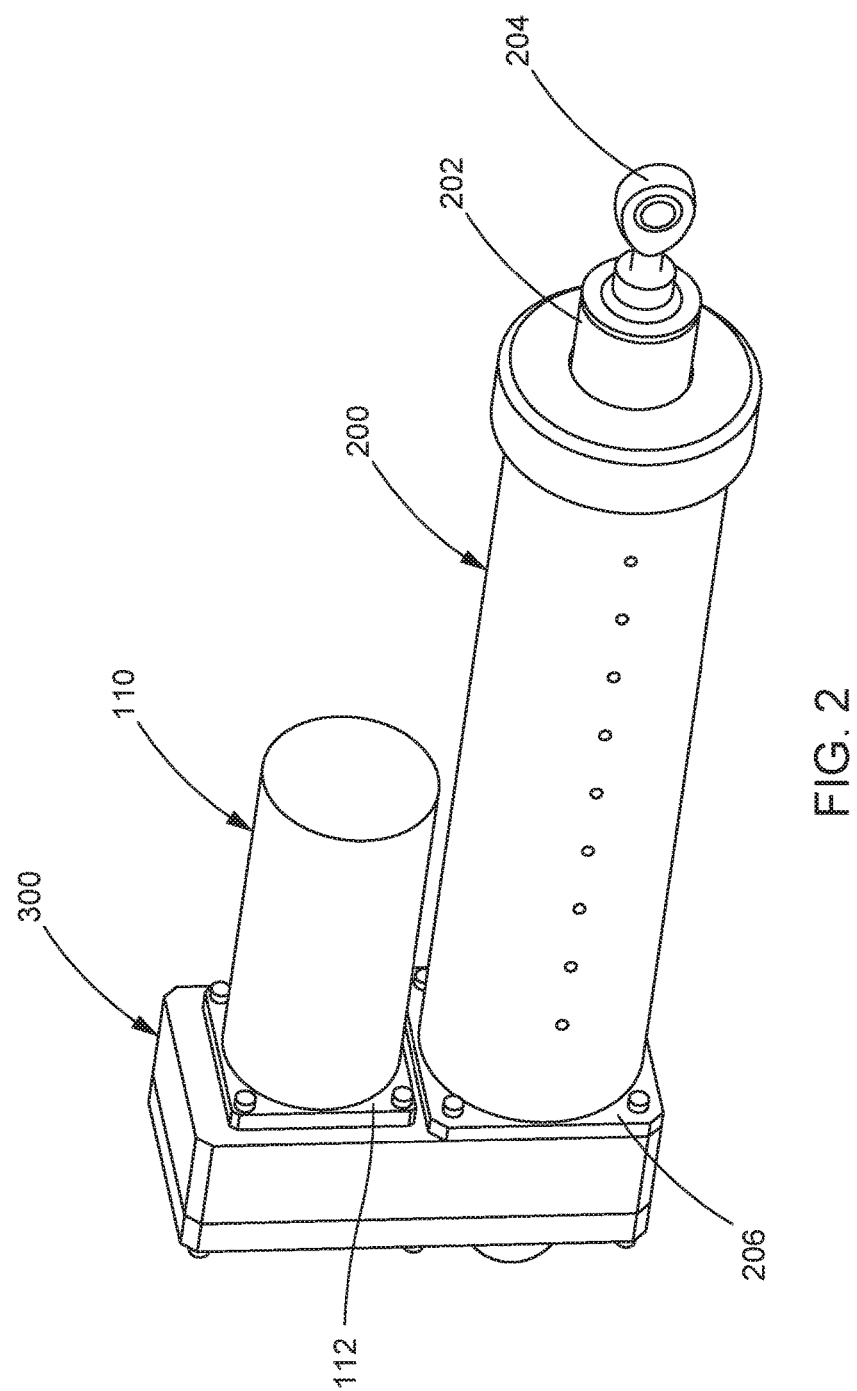
FIG. 2 is a another perspective view of a blow down actuator assembly, in accordance with certain aspects of the present disclosure.

As shown in FIG. 2, the actuator assembly may be modular, wherein each of the major components, such as the motor 110 and the drive assembly 200, for example, may be separately and independently attached and/or detached from the gear housing 300 for ease of maintenance and/or replacement. A motor mounting plate 112 and/or a drive assembly mounting plate 206 may be provided for mounting the motor 110 and the drive assembly 200 to the gear housing 300 via attachment means, such as bolts or screws.

Figure 3:
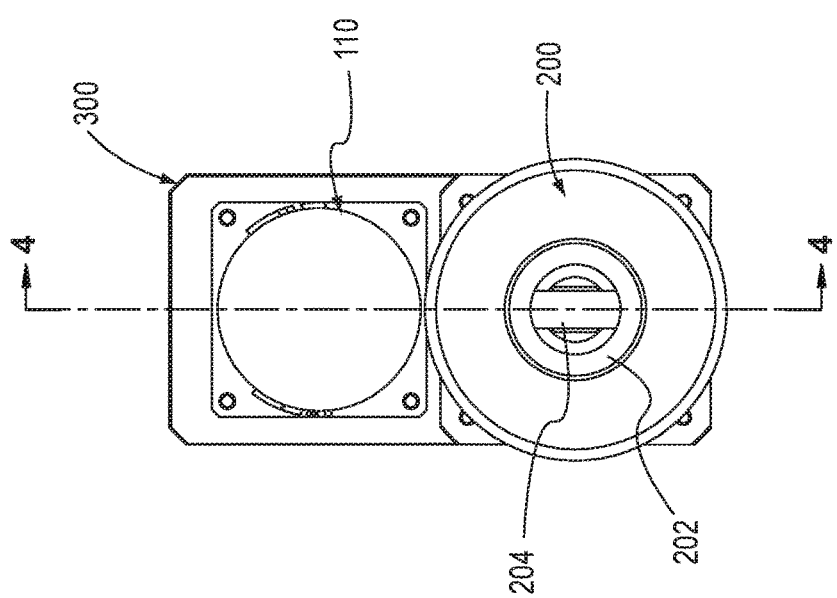
FIG. 3 is a side view of a blow down actuator assembly, in accordance with certain aspects of the present disclosure.
Figure 4:
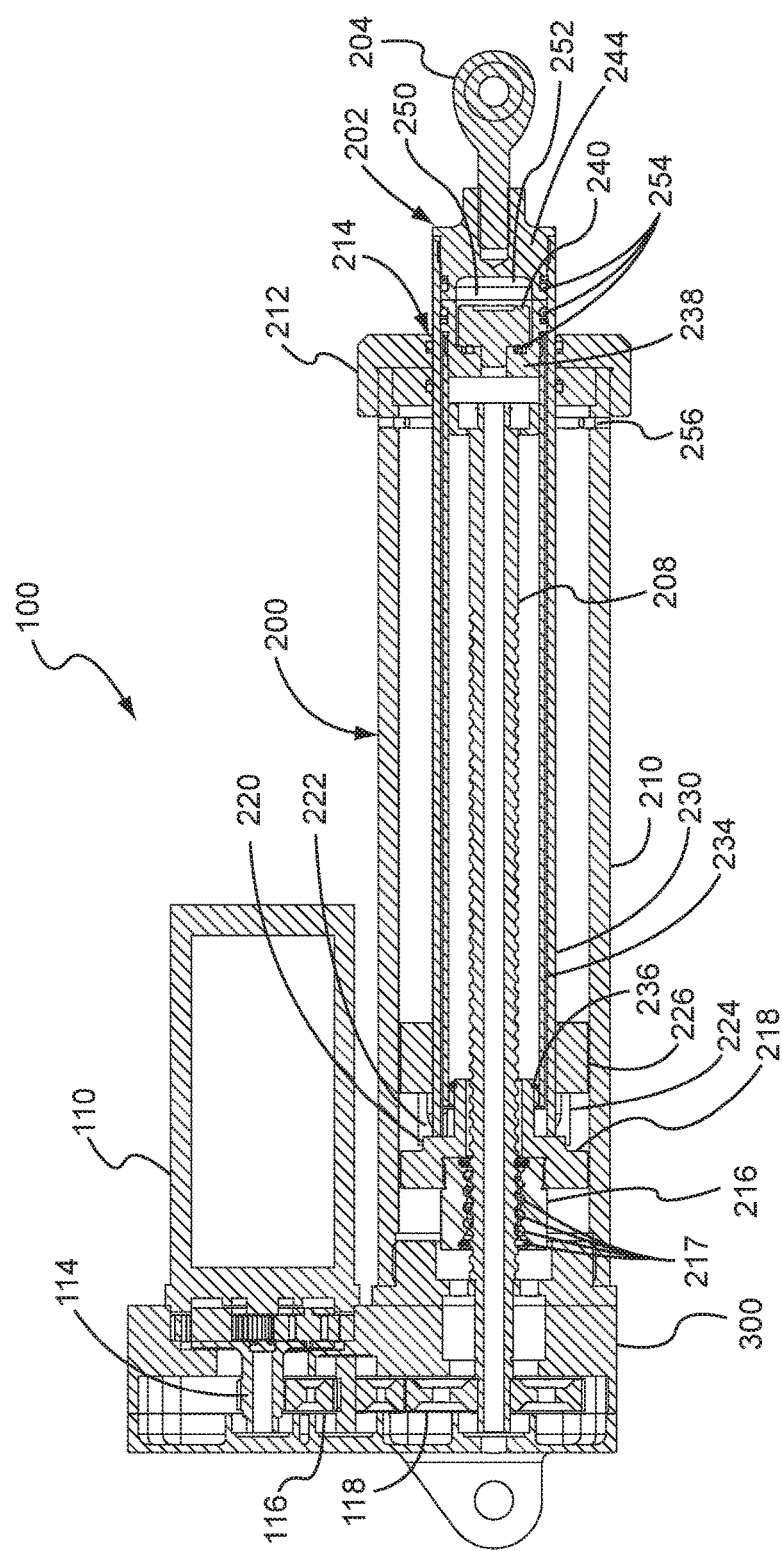
FIG. 4 is a cross-sectional view of the blow down actuator assembly as seen along line A-A in FIG. 3, in accordance with certain aspects of the present disclosure.

FIG. 3 is a side view of the actuator assembly shown in FIGS. 1 and 2. FIG. 4 provides a cross-sectional view of the actuator assembly 100 taken along the cross-sectional plane A-A of FIG. 3. The motor 110 may have a central drive shaft 114 that is operably connected through gears 116 and 118 to drive a ball screw 208 of the drive assembly 200. The drive assembly 200 has a cover tube 210 and end cap 212. The end cap 212 has a central orifice 214 through which the drive arm assembly 202 slidably extends. A ball nut 216 may be situated on the ball screw 208 such that, during normal operation of the drive assembly 200, rotation of the ball screw 208 forces the ball nut 216 via housed bearings 217 to travel along the raceway defined by the threading on the ball screw 208. The direction of rotation of the ball screw 208 determines whether the drive arm assembly 202 extends or retracts through the orifice 214.

A nut adapter 218 may be provided on a distal end of the ball nut 216. The nut adapter 218 may be formed with one or more notched seats 220 for seating one or more end portions 222 of one or more release levers 224. The release levers 224 may be rotatably mounted on a release cap 226, as described in further detail below.

The release cap 226 may be fixed to an actuation tube 230, which is the primary longitudinal body component of the piston-like drive arm assembly 202. A release tube 234 may be concentrically arranged inside of the actuation tube 230. A locking ring 236 is provided that releasably engages the release tube 234 and the actuation tube 230. The release tube 234 extends longitudinally within the actuation tube 230 to abut a release piston 238. The release piston 238 houses a gas generator 240. As shown in FIG. 4, a distal end of the actuation tube 230 extends beyond the release tube 234 and the release piston 238 when the release tube 234 and the actuation tube 230 are engaged in a locked position via the locking ring 236.

A sealing plug 244 is provided to close the distal end of the actuation tube 230. The sealing plug 244 may abut the release piston 238 during normal operation of the drive assembly 200. An expansion chamber 250 may be defined between the release piston 238 and the sealing plug 244. For example, the release piston 238 and/or the sealing plug 244 may be formed with a recessed area 252 to form the expansion chamber 250. The connection device 204 may be mounted, such as by press fit or via a threaded connection, for example, to the sealing plug 244, or may alternatively be integrally formed with the sealing plug 244. Multiple o-rings 254 or other suitable sealing mechanisms may be used to ensure that the expansion chamber 250 is completely sealed.

In accordance with other aspects of the present disclosure, the cover tube 210 may be provided with a locking channel 256, or any other suitable detent means, on an interior surface toward the distal end. As will be explained in greater detail below, the locking channel 256 may engage the release levers 224 during emergency operation of the actuator assembly 100.

Figure 5:
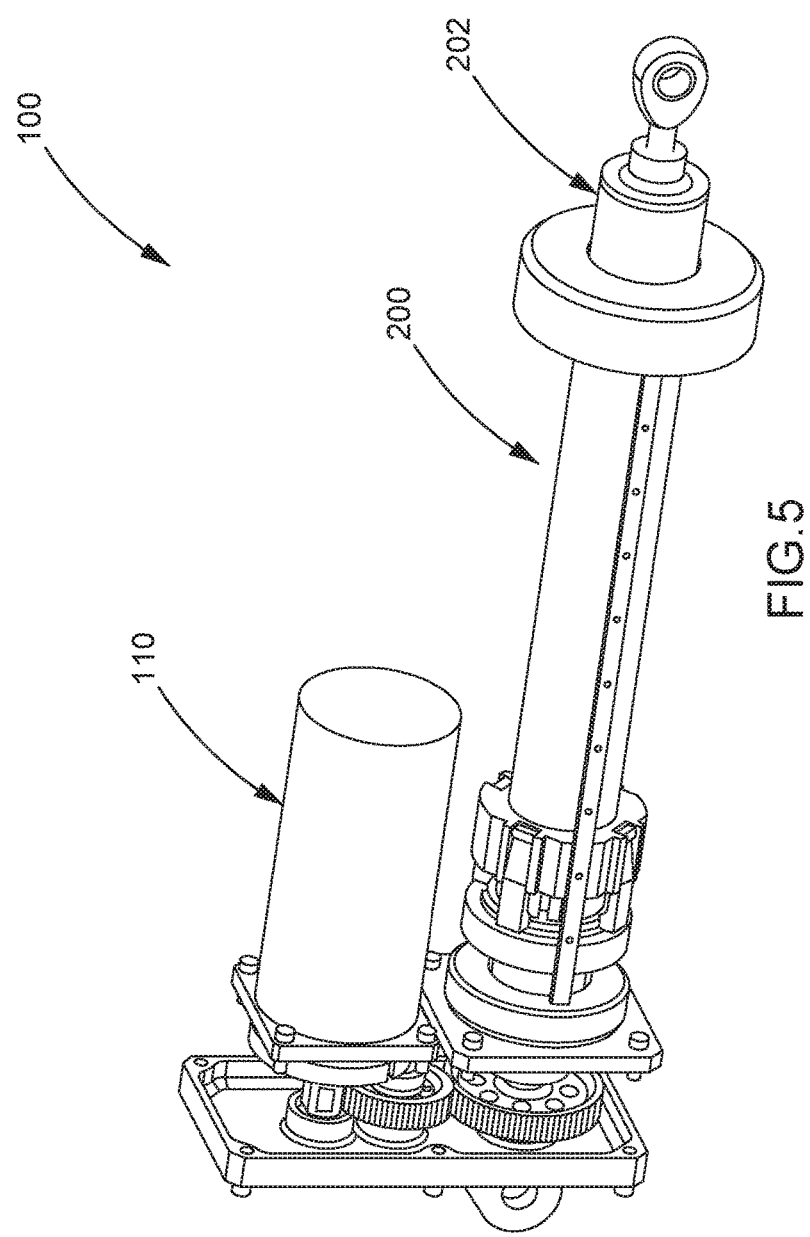
FIG. 5 is a front perspective view of a blow down actuator assembly with a cover tube and gear housing removed to illustrate internal components of the assembly, in accordance with certain aspects of the present disclosure.
Figure 6:
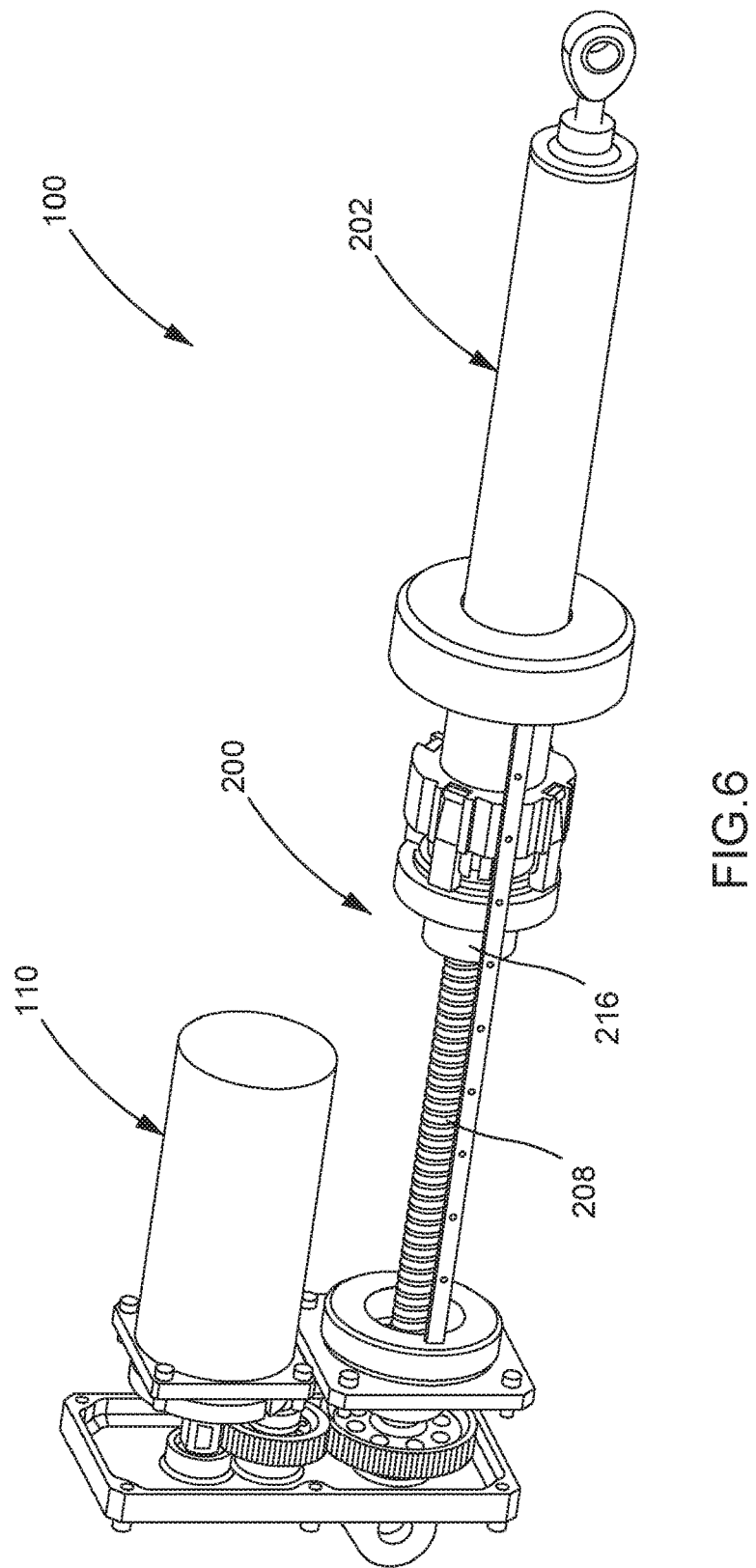
FIG. 6 is a front perspective view of a blow down actuator assembly with a cover tube and gear housing removed and with the drive arm assembly in an extended position of use, in accordance with certain aspects of the present disclosure.
Figure 7:
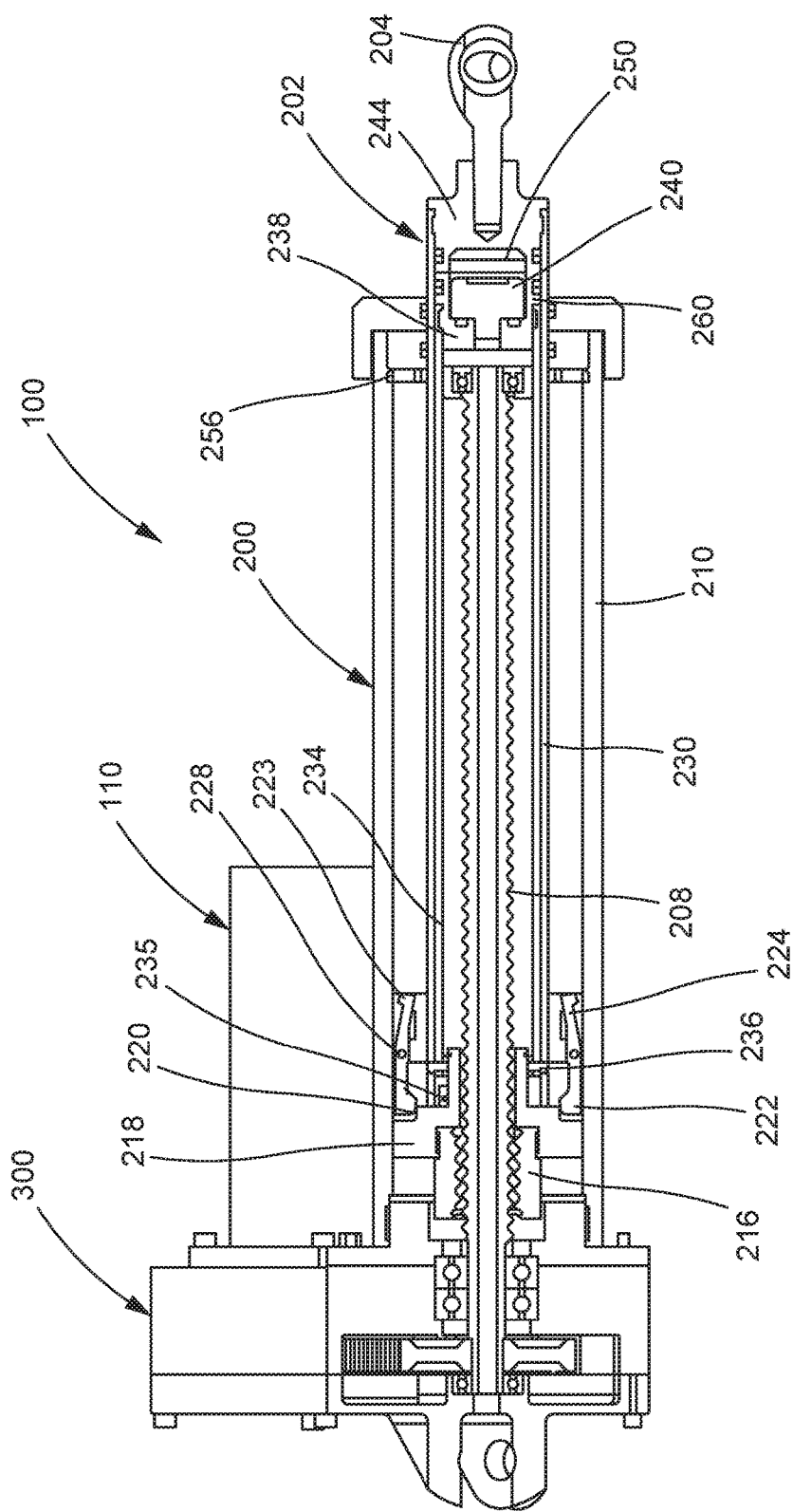
FIG. 7 is a cutaway front view of a blow down actuator assembly, in accordance with certain aspects of the present disclosure.

FIGS. 5-7 illustrate operation of the actuator assembly 100 during a normal mode, in which the motor 110 controls the drive assembly 200 to extend and/or retract the drive arm assembly 202. FIGS. 5 and 6 are illustrated with the cover tube 210 and gear housing removed to assist in an understanding of the operation of the internal components.

In particular, FIG. 5 illustrates the assembly 100 with the drive arm assembly 202 in a fully retracted position. To control movement of a controlled device, e.g., a landing gear, a signal may be sent to the motor 110 to extend the drive arm assembly 202 to a predetermined position, which may be fully extended and/or any position in between. As shown in FIG. 6, the motor 110 operates through the gear train to turn the ball screw 208, which in turn causes the ball nut 216 to extend along the shaft of the ball screw 208, pushing the drive arm assembly 202 to extend.

As shown in FIG. 7, in a normal mode of operation, the locking ring 236 is fully engaged with both the actuation tube 230 and the release tube 234. As such, the ball nut 216, the nut adapter 218, the actuation tube 230, and the release tube 234 are all engaged to move in unison as one assembly. The assembly may thus slide within the cover tube 210 to a desired position. Because the drive arm assembly moves in unison, the end portions 222 of the release levers 224 remain seated in a closed position between the seat 220 and the cover tube 210.

The release levers 224 may be mounted to the release cap 226 by a spring loaded hinge 228 having a spring load forcing the end portions 222 toward the seats 220. Thus, during normal operation, the catch ends 223 of the release levers 224 will not engage the locking channel 256 of the cover tube 210. The catch ends 223 of the release levers 224 may only be released to engage the locking channel 256 if the end portions 222 are unseated from the seats 220 to permit the spring force of the hinges 228 to rotate the catch ends 223 outward. In this manner, during normal mode operation, the drive arm assembly 202 may be extended to a fully open position without the actuator assembly 100 being locked by the release levers 224 in the fully open position. The drive arm assembly 202 may thus be retracted from a fully open position as desired.

FIGS. 7-13 illustrate an emergency mode of operation of the actuator assembly 100, during which aspects of the normal drive assembly are automatically decoupled to permit an emergency extension of the actuation tube 230 into a fully extended, locked position. For example, if during flight there is a malfunction of a component of the actuator assembly 100, such as the motor, the gear train, and/or the ball screw/ball nut, the landing gear may be prevented from achieving full extension. Accordingly, in this situation, the emergency mode of operation of the actuator assembly 100 could be automatically initiated or, for example, manually initiated by a pilot. As shown in FIG. 7, if the emergency mode is initiated, a signal may be electrically sent to the gas generator 240 to initiate an emergency sequence. In accordance with other aspects of the disclosure, the emergency mode may be activated by any suitable means, including mechanical actuation methods having an activation switch, such as a piezo switch or a firing pin. In accordance with yet other aspects of the present disclosure, the ball screw 208 may be hollow to permit a wire to carry the activation signal to the gas generator 240. The signal may initiate a process in the gas generator 240 that, for example, similar to conventional airbag devices, mixes sodium azide ($NaN_3$) and potassium nitrate ($KNO_3$) in a reaction that produces a large burst of hot nitrogen gas. The rapid expansion of the nitrogen gas is released into the expansion chamber 250. In yet other aspects of the present disclosure, the gas generator 240 may release any combination of chemicals, for example, that are known to rapidly release a supply of pressurized fluid into the expansion chamber 250. In accordance with yet other aspects of the present disclosure, conventional combustion techniques may be used to generate the necessary rapid pressure increase in the expansion chamber 250 as a result of activation of activation of the emergency backup system.

The rapid release of pressurized fluid into the expansion chamber 250 simultaneously produces pressure against the release piston 238 and the sealing plug 244. The release piston 238 may be formed with a flanged portion 260. When pressure is applied against the release piston 238, the flanged portion 260 engages the distal end of the release tube 234 to force the release tube 234 to slide in a direction towards the nut adapter 218 and the locking ring 236. As shown in FIG. 7, during normal operation, a space 235 exists between a proximal end of the release tube and the nut adapter 218. The space 235 allows room for the release tube 234 to release backward during emergency operation.

Figure 8:
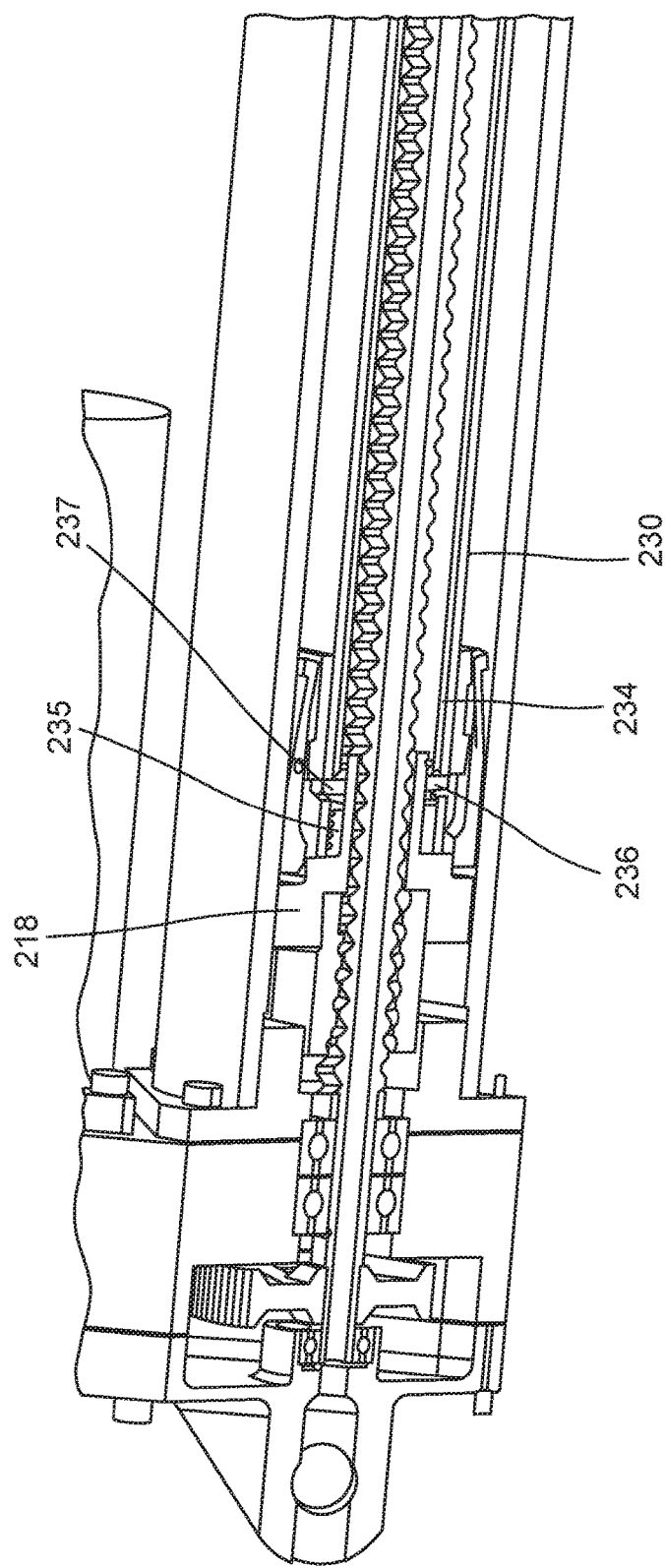
FIG. 8 is a close-up cutaway view of aspects of a blow down actuator assembly, in accordance with certain aspects of the present disclosure.
Figure 9:
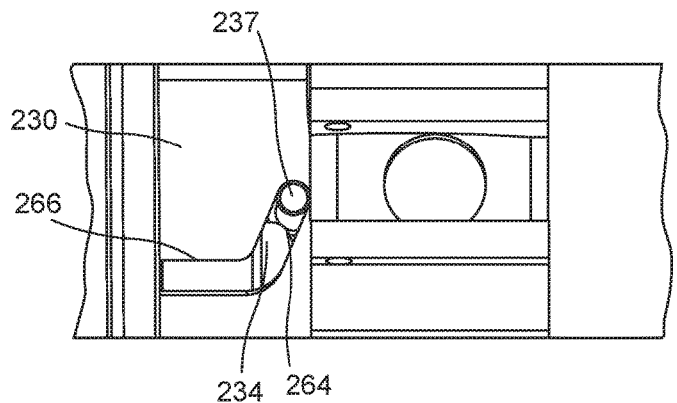
FIGS. 9-11 illustrate in series a locking ring mechanism for use on a blow down actuator assembly, in accordance with certain aspects of the present disclosure.
Figure 10:
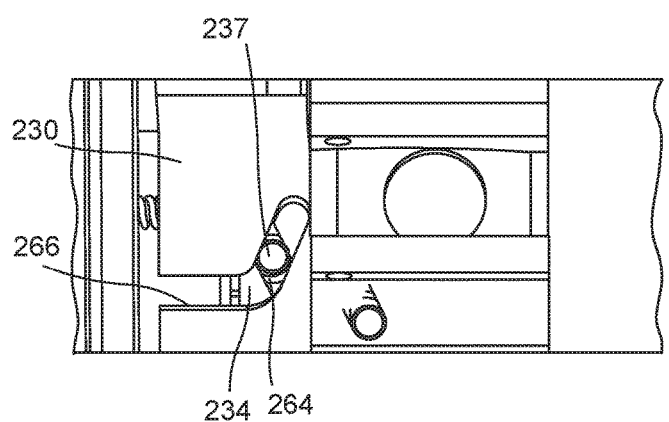
Figure 11:
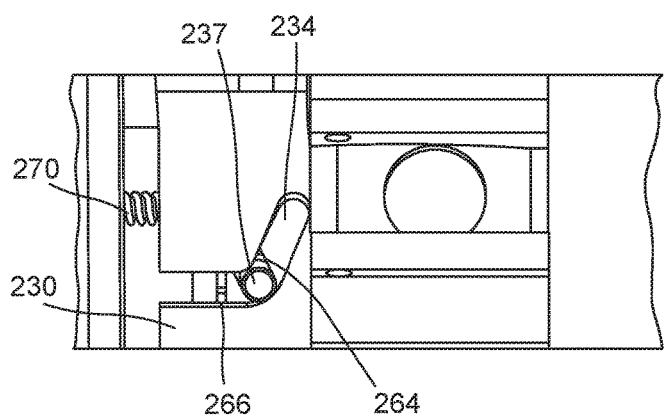

As shown in the cutaway view of FIG. 8, the locking ring 236 may be formed with protrusions 237 for engaging slots in the actuation tube 230 and the release tube 234. As shown in close-up series in FIGS. 9-11, as the release tube 234 is forced back by the increasing pressure in the expansion chamber 250, a slot 264 formed in the release tube 234 causes the protrusions 237 of the locking ring 236 to rotate through a slot 266 formed in the actuation tube 230. The slot 266 in the actuation tube is formed to permit release of the actuation tube 230 from the lock ring 236 once the lock ring 236 rotates through to the position shown in FIG. 11. A spring 270 may be provided to maintain tension on the release tube 234 to prevent premature actuation due to jarring and/or vibration.

Figure 12:
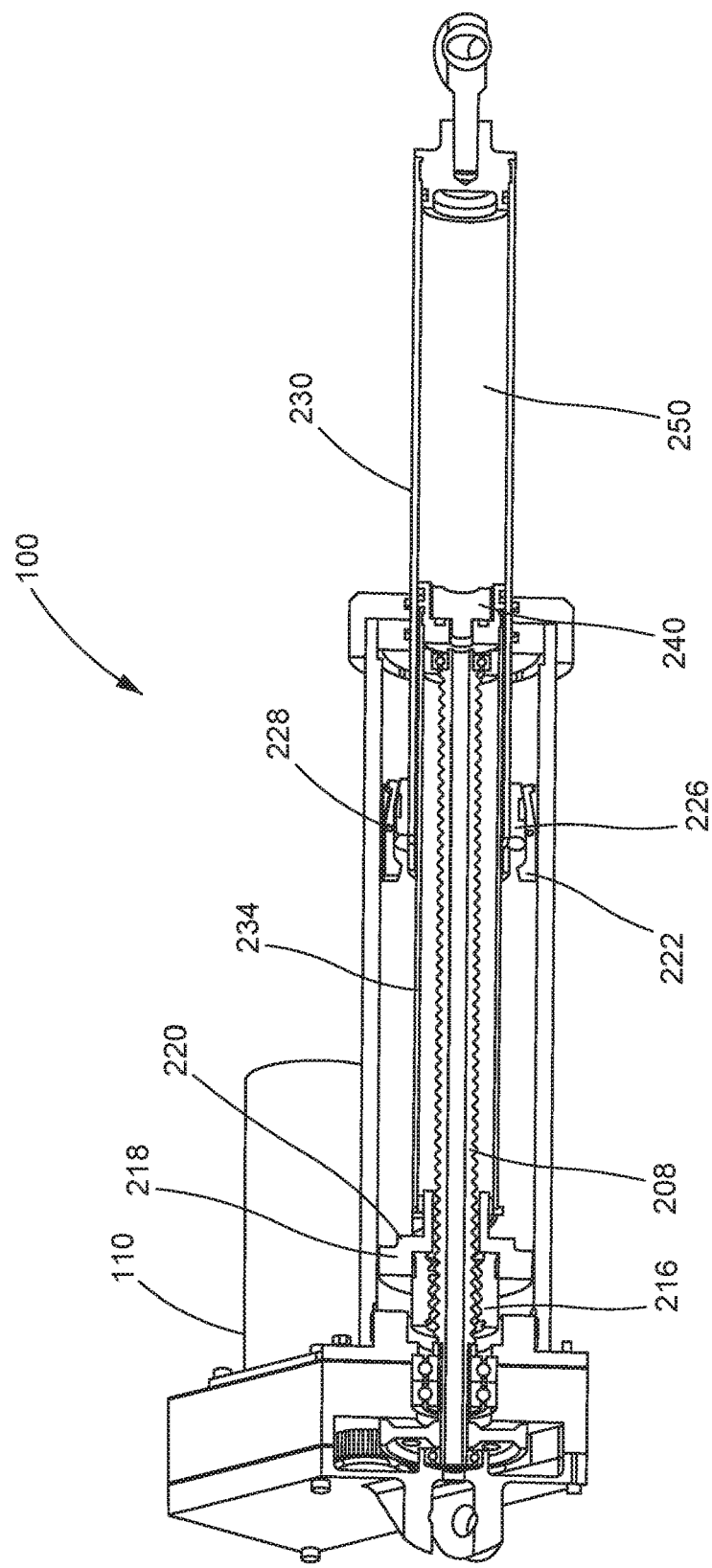
FIG. 12 is a cutaway front view of a blow down actuator assembly in an emergency mode of operation, in accordance with certain aspects of the present disclosure.
Figure 13:
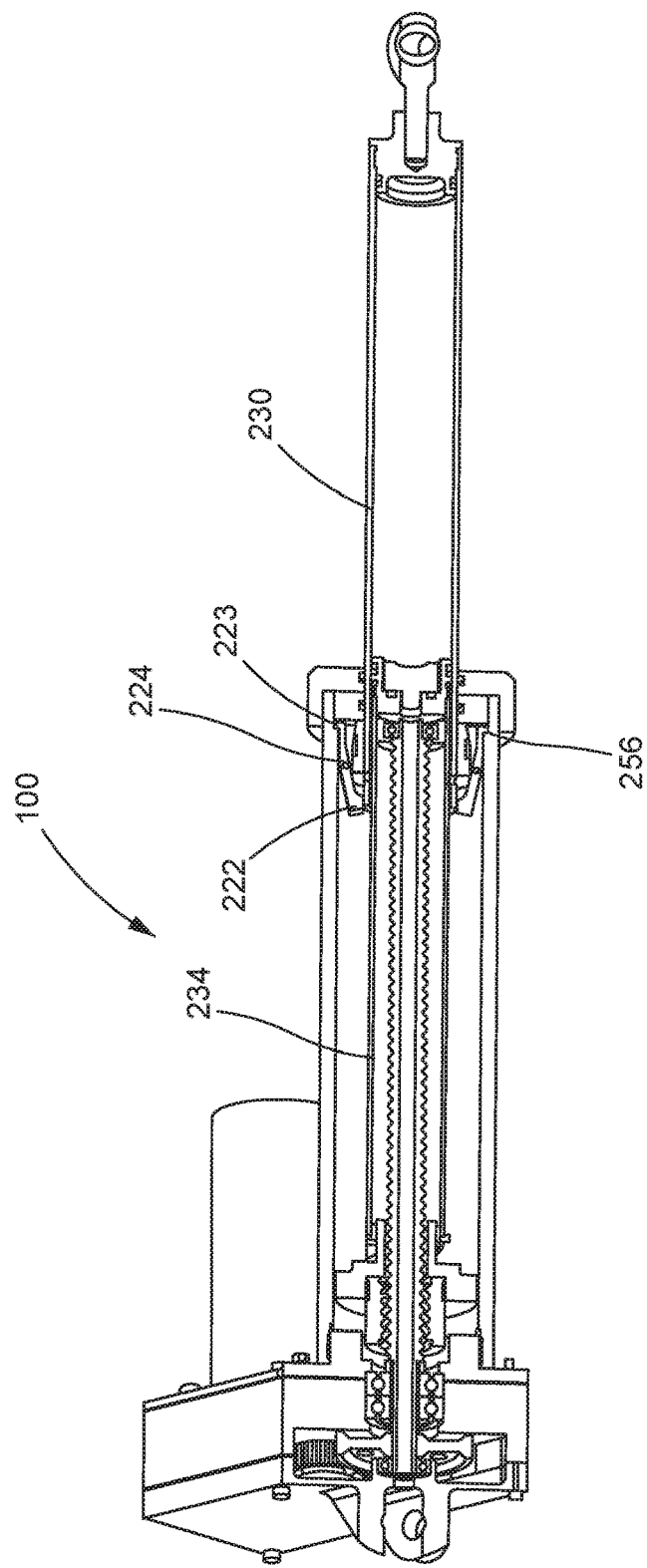
FIG. 13 is a cutaway front view of a blow down actuator assembly in an emergency mode of operation fully extended and mechanically locked, in accordance with certain aspects of the present disclosure.

The release tube 234 is formed to remain engaged with the lock ring 236 throughout the emergency activation procedure. Accordingly, once the actuation tube 230 reaches the position shown in FIG. 11, as shown in FIG. 12, the actuation tube 230 is free to extend, sliding past the locked release tube 234 and permitting the expansion chamber 250 to expand under pressure from the gas generator 240. As the actuation tube 230 extends, the release cap 226 mounted thereon also slides away from the ball nut 216 and the nut adapter 218, which remain locked in position by the release tube 234. The end portions 222 of the release levers 224 are thus freed from the seats 220 and may rotate inward under spring force from the spring loaded hinges 228. However, the cover tube 210 prevents rotation of the release levers 224 until, as shown in FIG. 13, the actuation tube 230 is in a fully extended position. At the fully extended position, the catch ends 223 of the release levers 224 are free to rotate into the locking channel 256. The actuation tube 230 may thus be prevented from sliding back into the cover tube 210 and the actuator assembly 100 locked in the fully extended position.

Of the many advantages of the present disclosure, activation of the emergency procedure may be initiated regardless of the stroke position of the drive arm assembly 202. As such, even if failure occurs during normal operation, midway through a procedure such as the lowering of landing gear, emergency activation of the blow down actuator assembly 100 automatically decouples those aspects of the assembly 100 associated with the normal drive mode and permits full extension of the actuation tube 230 into a locked position via those aspects of the assembly 100 associated with the integrated emergency backup system.

In accordance with yet other aspects of the present disclosure, a pressure relief valve may be provided to relieve excess pressure from the expansion chamber 250, particularly in the event the emergency mode is activated when the normal drive system has the drive arm assembly 202 in a nearly extended position. In that case, the expansion chamber 250 will not need to expand nearly as much as during the situation when the drive arm assembly 202 is in a substantially retracted position.

In accordance with yet another aspect of the present disclosure, the integrated emergency back-up actuation system described herein may be applied to non-linear actuator drive assemblies, for example, a rotary actuator.

Figure 14:
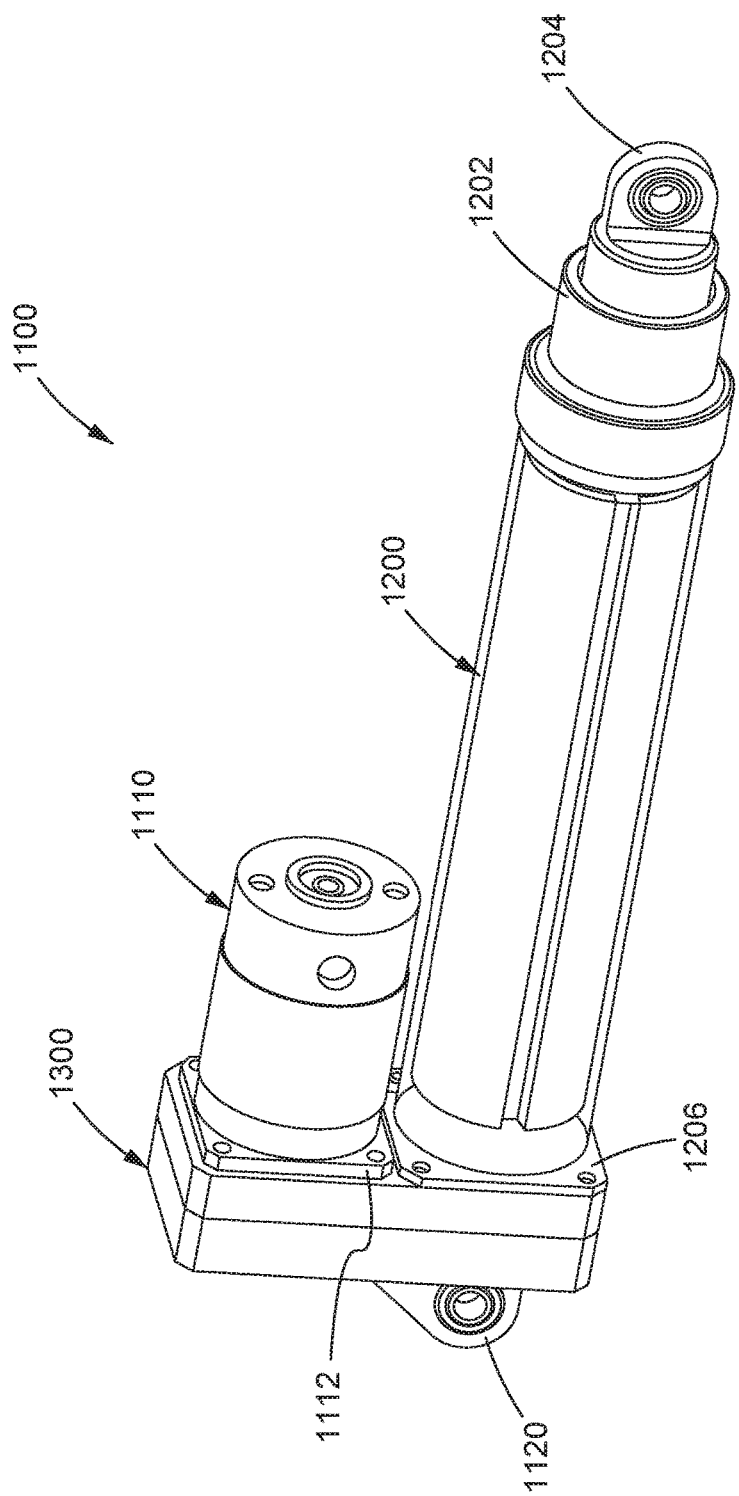
FIG. 14 is a perspective view of a blow down actuator assembly, in accordance with certain aspects of the present disclosure.
Figure 15:
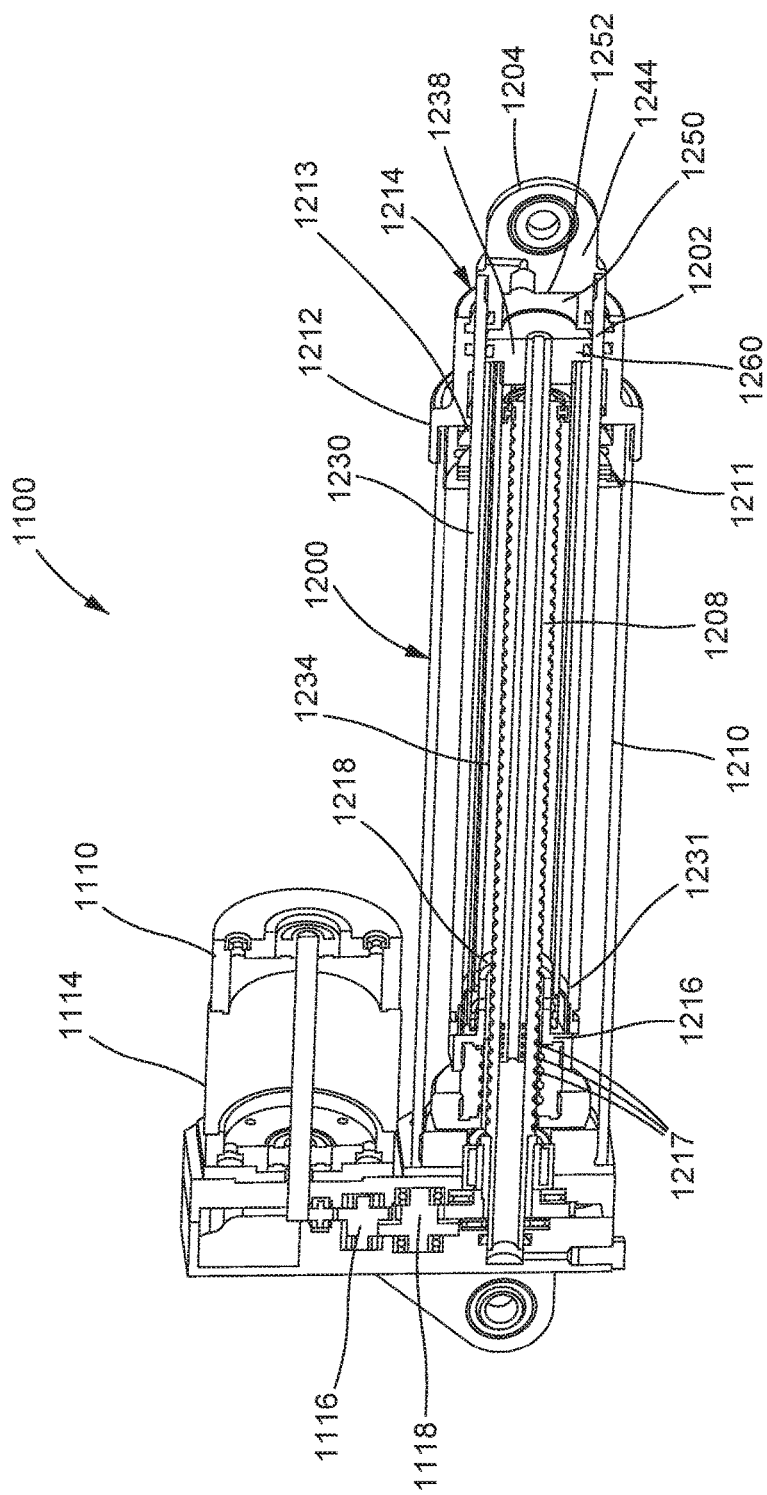
FIG. 15 is a cutaway front view of the blow down actuator assembly shown in FIG. 14, in accordance with certain aspects of the present disclosure.

FIGS. 14 and 15 illustrate an assembled blow down actuator assembly 1100 in accordance with yet other aspects of the present disclosure. The actuator assembly 1100 may include an electric motor 1110 operably connected to a drive assembly 1200 via a gear train housed in a gear housing 1300. A mounting device 1120, such as a bracket or any other suitable mounting mechanism, may be provided on a surface of the gear housing 1300 for mounting the actuator assembly 1100 to a stable support structure, such as the body structure of an airplane. The drive assembly 1200 includes a drive arm assembly 1202 for actuation of a controlled member, such as a control surface, door, or a landing gear, for example. A distal end of the drive arm assembly 1202 may be provided with a connection device 1204, such as an eye bolt rod or any other suitable connection device, for connecting the drive arm assembly 1202 to the controlled member.

The actuator assembly may be modular, wherein each of the major components, such as the motor 1110 and the drive assembly 1200, for example, may be separately and independently attached and/or detached from the gear housing 1300 for ease of maintenance and/or replacement. A motor mounting plate 1112 and/or a drive assembly mounting plate 1206 may be provided for mounting the motor 1110 and the drive assembly 1200 to the gear housing 1300 via attachment means, such as bolts or screws.

FIG. 15 provides a cross-sectional view of the actuator assembly 1100. The motor 1110 may have a central drive shaft 1114 that is operably connected through gears 1116 and 1118 to drive a ball screw 1208 of the drive assembly 1200. The drive assembly 1200 has a cover tube 1210 and end cap 1212. The end cap 1212 has a central orifice 1214 through which the drive arm assembly 1202 slidably extends. A housing 1211 for an expandable retaining ring assembly 1213 may be configured toward the distal end of the cover tube 1210.

A ball nut 1216 may be situated on the ball screw 1208 such that, during normal operation of the drive assembly 1200, rotation of the ball screw 1208 forces the ball nut 1216 via housed bearings 1217 to travel along the raceway defined by the threading on the ball screw 1208. The direction of rotation of the ball screw 1208 determines whether the drive arm assembly 1202 extends or retracts through the orifice 1214.

A nut adapter 1218 may be provided on a distal end of the ball nut 1216. An actuation tube 1230, which is the primary longitudinal body component of the piston-like drive arm assembly 1202 may be concentrically arranged around a release tube 1234. The release tube 1234 extends longitudinally within the actuation tube 1230 to abut a release piston 1238. A distal end of the actuation tube 1230 extends beyond the release tube 1234 and the release piston 1238 when the release tube 1234 and the actuation tube 1230 are engaged in a locked position via a securing mechanism, and a proximal end of the actuation tube 1230 may be configured with a retention groove 1231.

A sealing plug 1244 is provided to close the distal end of the actuation tube 1230. The sealing plug 1244 may abut the release piston 1238 during normal operation of the drive assembly 1200. An expansion chamber 1250 may be defined between the release piston 1238 and the sealing plug 1244. For example, the release piston 1238 and/or the sealing plug 1244 may be formed with a recessed area 1252 to form the expansion chamber 1250. The connection device 1204 may be mounted, such as by press fit or via a threaded connection, for example, to the sealing plug 1244, or may alternatively be integrally formed with the sealing plug 1244. Multiple o-rings or other suitable sealing mechanisms may be used to ensure that the expansion chamber 1250 is completely sealed.

FIGS. 16 and 17 illustrate operation of the actuator assembly 1100 during a normal mode, in which the motor 1110 controls the drive assembly 1200 to extend and/or retract the drive arm assembly 1202. FIGS. 16 and 17 are illustrated with the cover tube 1210 and gear housing removed to assist in an understanding of the operation of the internal components.

In particular, FIG. 16 illustrates the assembly 1100 with the drive arm assembly 1202 in a fully retracted position. To control movement of a controlled device, e.g., a landing gear, a signal may be sent to the motor 1110 to extend the drive arm assembly 1202 to a predetermined position, which may be fully extended and/or any position in between. As shown in FIG. 17, the motor 1110 operates through the gear train to turn the ball screw 1208, which in turn causes the ball nut 1216 to extend along the shaft of the ball screw 1208, pushing the drive arm assembly 1202 to extend.

Figure 18:
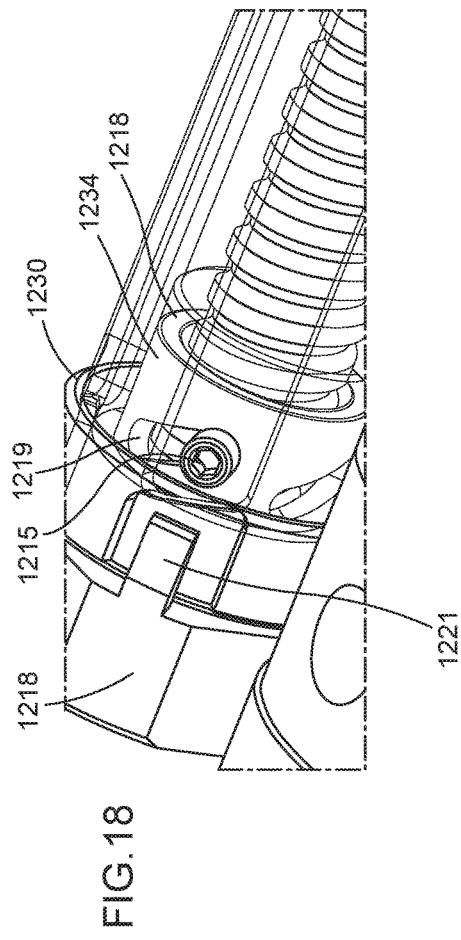
FIG. 18 is a close-up cutaway view of aspects of the blow down actuator assembly shown in FIG. 14, in accordance with certain aspects of the present disclosure.
Figure 19:
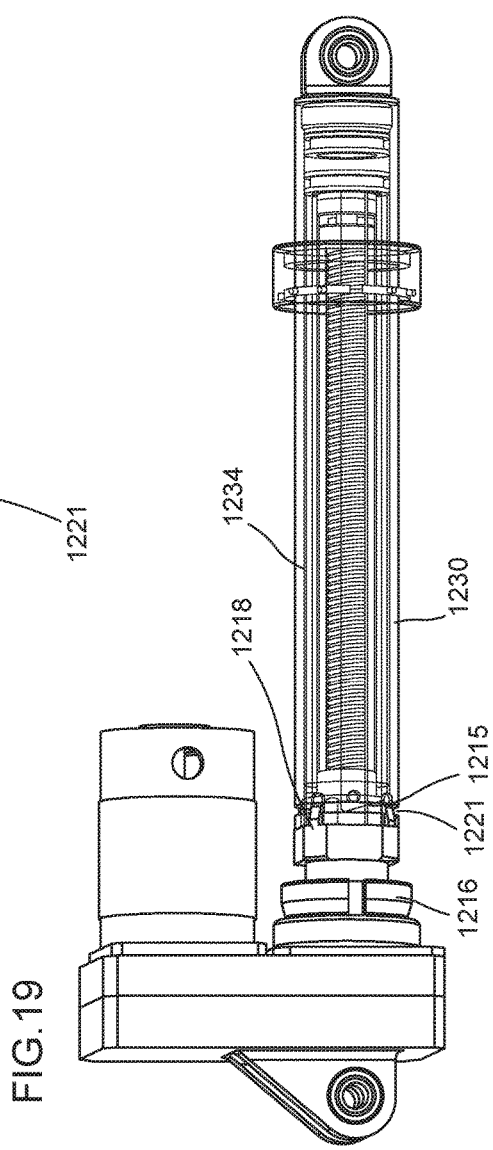
FIG. 19 is a front cutaway view of aspects of the blow down actuator assembly shown in FIG. 14, in accordance with certain aspects of the present disclosure.

As shown in FIGS. 18 and 19, the actuation tube 1230 and the release tube 1234 may be engaged by a retaining pin 1215 that slides in a slot 1219 provided in the nut adapter 1218. In a normal mode of operation, the retaining pin 1215 ensures that both the actuation tube 1230 and the release tube 1234 are fully engaged such that the ball nut 1216, the nut adapter 1218, the actuation tube 1230, and the release tube 1234 are all secured to move in unison as one assembly. The assembly may thus slide within the cover tube 1210 (not shown in FIGS. 18 and 18) to a desired position.

The nut adapter 1218 may be formed with ramped extensions 1221. The function of the ramped extensions 1221 is explained in further detail below. However, during normal operations, the ramped extensions 1221 prevent the expandable retaining ring assembly 1213 from engaging the retention groove 1231 on the actuation tube 1230.

Figure 20:
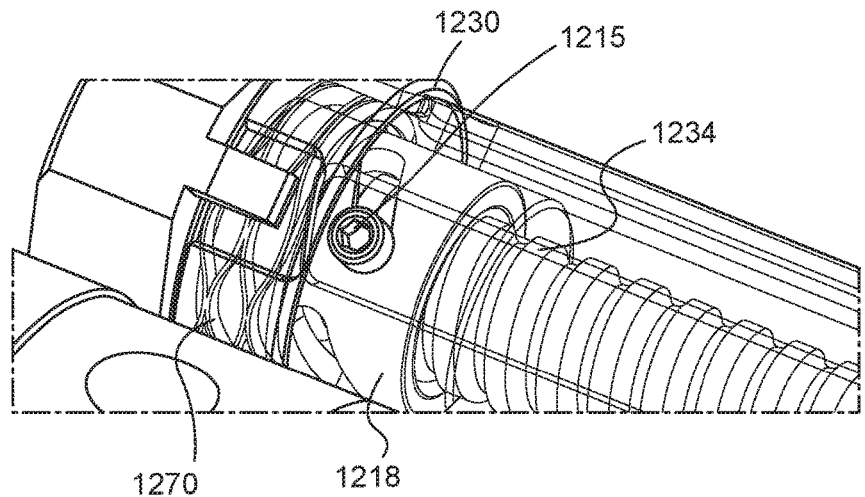
FIGS. 20 and 21 illustrate in series a securing mechanism for use on a blow down actuator assembly, in accordance with certain aspects of the present disclosure.
Figure 21:
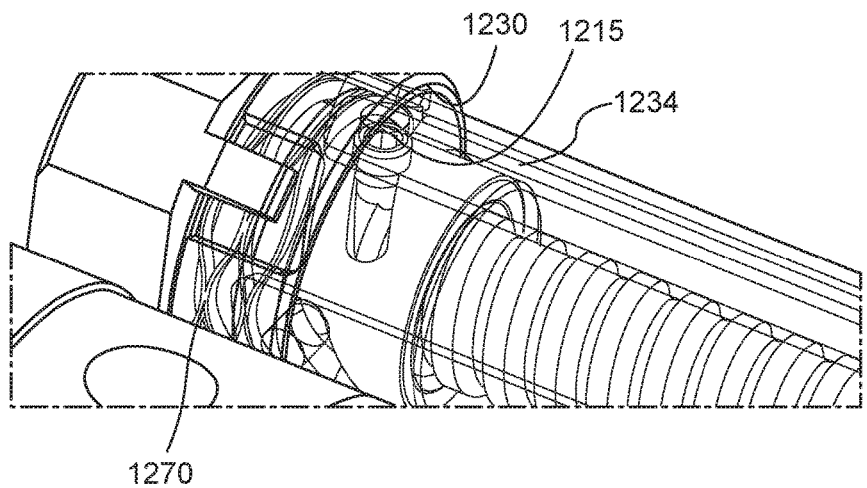
Figure 22:
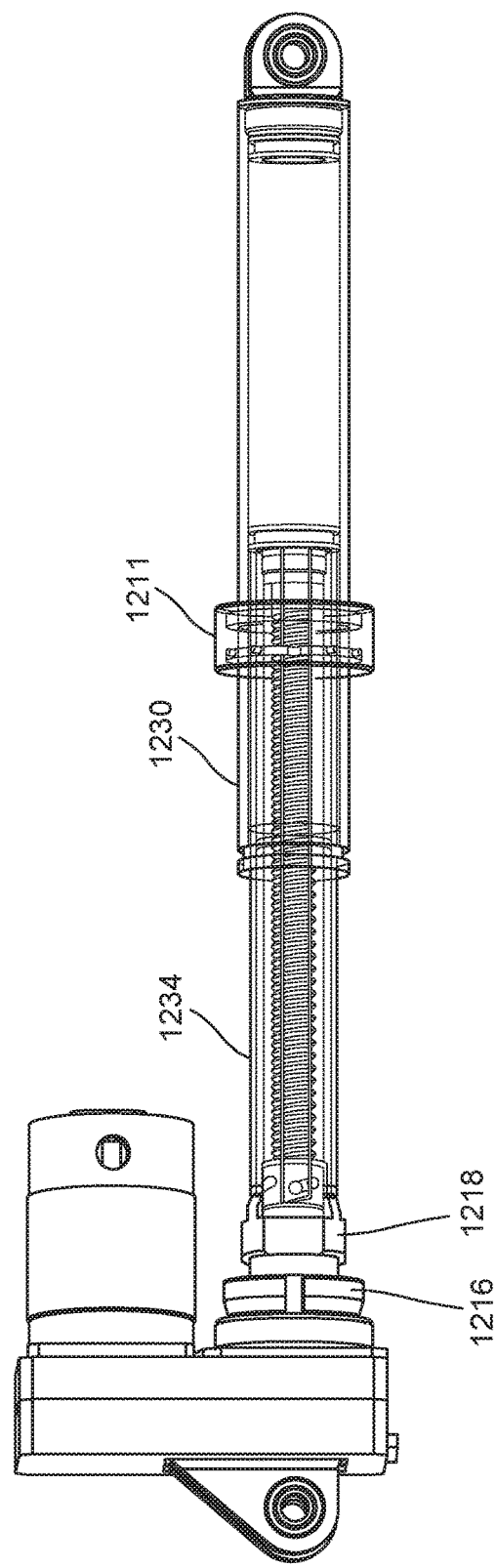
FIG. 22 is a cutaway front view of the blow down actuator assembly shown in FIG. 14 with a cover tube removed to illustrate internal components in an emergency mode of operation, in accordance with certain aspects of the present disclosure.

FIGS. 20-22 illustrate an emergency mode of operation of the actuator assembly 1100, during which aspects of the normal drive assembly may be automatically decoupled to permit an emergency extension of the actuation tube 1230 into a fully extended, locked position. For example, if during flight there is a malfunction of a component of the actuator assembly 1100, such as the motor, the gear train, and/or the ball screw/ball nut, the landing gear may be prevented from achieving full extension. Accordingly, in this situation, the emergency mode of operation of the actuator assembly 1100 could be automatically initiated or, for example, manually initiated by a pilot. Referring back to FIG. 15, if the emergency mode is initiated, a signal may be electrically sent to actuate a source of pressurized gas into the hollow tube portion of the ball screw 1208. In accordance with other aspects of the disclosure, the emergency mode may be activated by any suitable means, including mechanical actuation methods having an activation switch, such as a piezo switch or a firing pin. Any suitable pressurized gas, such as nitrogen, may be provided from a pressurized gas source, such as a gas generator (not shown), attached to or situated near the assembly 1100 or connected by a conduit for delivery from any external location. Various types of pressure connection fittings for attachment of a pressure conduit may be configured into the assembly to allow for quick attachment or detachment to the source of pressurized gas. The pressurized gas may be delivered into the proximal end of the hollow tube portion of the ball screw 1208, and forced into the expansion chamber 1250.

The rapid release of pressurized fluid into the expansion chamber 1250 simultaneously produces pressure against the release piston 1238 and the sealing plug 1244. As shown in FIG. 14, the release piston 1238 may be formed with a flanged portion 1260. When pressure is applied against the release piston 1238, the flanged portion 2160 engages the distal end of the release tube 1234 to force the release tube 1234 to slide in a direction towards the nut adapter 1218 and the retaining pin 1215. As shown in FIGS. 20 and 21, as the release tube 1234 is forced in a rearward direction by the increasing pressure in the expansion chamber 1250, the retaining pin 1215 slides in the slot on the nut adapter 1218 and forces the release tube 1234 to rotate into a position in which the actuation tube 1230 is free to disengage from the release tube 1234 and the nut adapter 1218. Detents, grooves, a spring pin, and/or any suitable means for permitting disengagement of the actuation tube 1230 from the release tube 1234 may be used. Accordingly, as shown in FIG. 22, with the actuation tube 1230 disengaged from the release tube 1234 and the nut adapter 1218, the actuation tube 1230 is free to extend due to the pressure increasing the expansion of the expanding chamber 1250. A spring 1270 (see FIGS. 20 and 21) may be provided to maintain tension on the release tube 1234 to prevent premature actuation due to jarring and/or vibration.

The release tube 1234 is formed to remain engaged with the nut adapter 1218 and the ball nut 1216 via the retaining pin 1215 throughout the emergency activation procedure. The actuation tube 1230 extends until, as shown in FIG. 23, the retention groove 1231 on the actuation tube 1230 enters the housing 1211 wherein the expandable retaining ring assembly 1213 is forced by biasing means to compress into the retention groove 1231 for locking the actuation tube 1230 into an fully extended position. The expandable retaining ring assembly 1213 may be configured to be four quarter circle ring pieces for example, which are spring actuated into a biasing position toward the actuation tube 1230. During normal operation, the expandable retaining ring assembly 1213, or the components thereof, is prevented from compression by the exterior wall of the actuation tube 1230. As illustrated in FIG. 26, for example, the ramped extensions 1221 on the nut adapter 1218 are formed to align with grooves 1229 configured at predetermined locations on the free end periphery of the actuation tube 1230. During normal operation (refer back to FIG. 17), the ramped extensions 1221 are seated in the grooves 1229 and extend across the retention groove 1231. As such, when the actuation tube 1230, the release tube 1234, and the nut adapter 1218 slide toward housing 1211, the ramped extensions 1221 prevent the retaining ring assembly 1213 from compressing into the retention groove 1231. Thus, during normal operation, the ramped extensions 1221 permit proper retraction of the actuation tube 1230.

However, as shown in FIGS. 24-26, in accordance with yet other aspects of the present disclosure, the ramped extensions 1221 on the nut adapter 1218 are also configured to disengage an engaged retention ring 1213 to permit a reset of the actuator assembly 1100 once the emergency situation is resolved. In combination with the absence of a gas generator internal to the actuator assembly 1100, the blow down actuator assembly 1100 does not thus require complete disassembly and reassembly to reset for the next emergency operation.

As shown in FIGS. 24-26, to reset the actuator assembly 1100, the ball screw 1208 may be actuated to move the ball nut 1216, nut adapter 1218, and release tube 1234 as a unit toward the actuation tube 1230 that is locked in the extended position by the retention ring 1213 being biased into the retention groove 1231. The ramped extensions 1221 slide toward the housing 1211 and into the grooves 1229 (see FIG. 25). Continued turning of the ball screw 1208 forces the ramped extensions 1221 to push under and expand the expanding ring assembly 1213 to disengage the ring assembly 1213 from the ring groove 1231. The release tube 1234 may thus reengage the actuation tube 1230 such that the entire arm assembly, now assembly, is reset and may be retracted into housing 1210 to operate under normal conditions. The procedure may be repeated as necessary as long as a pressure source is replaced or configured to supply pressurized gas to the assembly 1100 during a subsequent emergency situation.

Of the many advantages of the present disclosure, activation of the emergency procedure may be initiated regardless of the stroke position of the drive arm assembly 1202. As such, even if failure occurs during normal operation, midway through a procedure such as the lowering of landing gear, emergency activation of the blow down actuator assembly 1100 automatically decouples those aspects of the assembly 1100 associated with the normal drive mode and permits full extension of the actuation tube 1230 into a locked position via those aspects of the assembly 1100 associated with the integrated emergency backup system.

In accordance with yet other aspects of the present disclosure, a pressure relief valve may be provided to relieve excess pressure from the expansion chamber 1250, particularly in the event the emergency mode is activated when the normal drive system has the drive arm assembly 1202 in a nearly extended position. In that case, the expansion chamber 1250 will not need to expand nearly as much as during the situation when the drive arm assembly 1202 is in a substantially retracted position.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An actuator assembly, comprising:
   a drive assembly comprising a drive arm assembly configured to extend and retract in order to actuate a controlled member;
   the drive arm assembly comprises an actuation member;
   the drive arm assembly further comprises a release member; and
   a source of pressurized gas;
   wherein during a normal mode of operation, the actuation member and the release member are engaged with a securing mechanism to move in unison to extend the controlled member;
   wherein during an emergency mode of operation, pressurized gas from the source of pressurized gas automatically decouples the actuation member from the release member to move separately in order for the actuation member to extend the controlled member; and
   wherein the securing mechanism is configured to lock the actuation member in a fully extended position during the emergency mode of operation.

2. The actuator assembly of claim 1, further comprising a cover tube having an end cap and a seal plug;
   an expandable retention ring housed toward a distal end of the cover tube, wherein the actuation member includes a circumferential retention groove, the expandable retention ring being biased to compress into the circumferential retention groove when the actuation member extends a predetermined distance from the end cap of the cover tube.

3. The actuator assembly of claim 1, further comprising:
   a nut adapter coupled to a ball nut and the release member, the nut adapter being configured with a release mechanism for expanding an expandable retention ring when the release member is secured to the actuation member,
   wherein the expandable retention ring comprises at least two arcuate sections.

4. The actuator assembly of claim 1, further comprising a ball screw configured with a raceway on a periphery thereof and a ball nut configured to house bearings that ride on the raceway, the ball nut being coupled to the actuation member during the normal mode of operation such that a direction of rotation of the ball screw determines whether the actuation member extends or retracts from a housing.

5. The actuator assembly of claim 1, wherein the securing mechanism is configured to releasably lock the actuation member to the release member during the normal mode of operation such that the actuation member and the release member are engaged to move in unison as one assembly.

6. The actuator assembly of claim 5, further comprising a cover tube covering the actuation member, an end cap provided at an end of the cover tube and through which the actuation member extends, and a seal plug provided to close an end of the actuation member.

7. The actuator assembly of claim 6, wherein the release member is configured to move toward the actuation member that is locked in the fully extended position to reset the release member with the actuation member such that the release member and the actuation member thereafter operate in the normal mode of operation.

8. The actuator assembly of claim 7, further comprising a release piston that defines an expansion chamber between the release piston and the seal plug within the actuation member.

9. The actuator assembly of claim 8, wherein when pressurized gas is released into the expansion chamber, the release member is driven to unlock the securing mechanism, releasing the actuation member to move past the release member.

10. A landing gear unit for an airplane including an actuator assembly according to claim 1,
    wherein the controlled member comprises landing gear.

11. An electro-mechanical actuator comprising:
    an electro-mechanical drive system that comprises an actuation member and a release member; and
    an integrated backup system operated by pressurized gas;
    wherein during a normal mode of operation, the actuation member and the release member are engaged with a securing mechanism to move in unison to extend a controlled member to a predetermined position; and
    wherein when the integrated backup system is activated during an emergency mode of operation, the electro-mechanical drive system is decoupled such that the actuation member and the release member move separately in order for the actuation member to extend the controlled member to the predetermined position and a securing mechanism mechanically locks the controlled member in the predetermined position.

12. The electro-mechanical actuator of claim 11, further comprising
    a cover tube having an end cap and a seal plug;
    an expandable retention ring housed toward a distal end of the cover tube, wherein the actuation member includes a circumferential retention groove, the expandable retention ring being biased to compress into the circumferential retention groove when the actuation member extends a predetermined distance from the end cap of the cover tube.

13. The electro-mechanical actuator of claim 11, further comprising:
    a nut adapter coupled to a ball nut and the release member, the nut adapter being configured with a release mechanism for expanding an expandable retention ring when the release member is secured to the actuation member,
    wherein the expandable retention ring comprises at least two arcuate sections.

14. The electro-mechanical actuator of claim 11, further comprising
    a cover tube having an end cap and a seal plug;
    an expandable retention ring housed toward a distal end of the cover tube, wherein the actuation member includes a circumferential retention groove, the expandable retention ring being biased to compress into the circumferential retention groove when the actuation member extends a predetermined distance from the end cap of the cover tube; and
    a nut adapter coupled to a ball nut and the release member, the nut adapter being configured with a release mechanism for expanding the expandable retention ring when the release member is secured to the actuation member, wherein the expandable retention ring comprises at least two arcuate sections.

15. The electro-mechanical actuator of claim 11, further comprising:
   a nut adapter coupled to a ball nut and the release member, the nut adapter being configured with a release mechanism for expanding the expandable retention ring when the release member is secured to the actuation member,
   wherein the expandable retention ring comprises at least two arcuate sections; and
   wherein the electro-mechanical drive system includes a ball screw configured with a raceway on a periphery thereof and the ball nut is configured to house bearings that ride on the raceway, the ball nut being coupled to drive the actuation member during the normal mode of operation.

16. The electro-mechanical actuator of claim 11, wherein the electro-mechanical drive system includes a ball screw configured with a raceway on a periphery thereof and a ball nut housing bearings that ride on the raceway, the ball nut being coupled to drive the actuation member during the normal mode of operation.

17. The electro-mechanical actuator of claim 11, wherein the pressurized gas is pressurized nitrogen.

18. The electro-mechanical actuator of claim 11, wherein the electro-mechanical drive system comprises a release piston that defines an expansion chamber for receiving the pressurized gas.

19. The electro-mechanical actuator of claim 11, wherein the securing mechanism comprises an expandable retention ring biased to engage a ring groove on a drive arm of the electro-mechanical drive system.

20. A landing gear unit for an airplane including an electro-mechanical actuator according to claim 11,
   wherein the controlled member comprises landing gear.

* * * * *